United States Patent Office 2,831,897
Patented Apr. 22, 1958

2,831,897

PROCESS OF MAKING 4,4'-ALKYLIDENE BISPHENOLS

James O. Harris, St. Albans, and William W. Paris, Nitro, W. Va., assignors to Monsanto Chemical Company, St. Louis, Mo., a corporation of Delaware No Drawing. Application April 9, 1954
Serial No. 422,266

4 Claims. (Cl. 260—619)

The present invention relates to an improvement in the method of manufacturing an aldehyde-phenol condensation product which more accurately is describable as an alkyl or alkylidene bisphenol. More specifically the present invention is directed to an improved method of manufacturing 4,4'-butylidene bis(6-tert-butyl-m-cresol) in good yield and of high purity by means of a much shorter reaction time and under safer operating conditions than heretofore have been described. Obviously other analogous aldehydes of the alkyl or alkylidene series, or even chlorine or sulfur derivatives of such aldehydes and other phenols, preferably alkyl substituted monophenols, may be employed in place of those specifically mentioned in the examples hereinafter set forth.

Heretofore a bisphenol has been manufactured by slowly adding an acid condensing agent, usually concentrated hydrochloric or concentrated sulfuric acid, to a mixture of the particular phenol and aldehyde, with vigorous agitation. A strong reaction ensues depending on the rate of acid addition, and degree of cooling employed, thereby either unduly lengthening the reaction time or developing undesirable side reaction products difficult of removal. Moreover, as mentioned by Beaver and Stoffel [Jour. Am. Chem. Soc. 74, 3410(1952)], it was necessary to carry out spot tests during the initial reaction period to determine a choice in precipitant to be employed.

The difficulties above mentioned and others, have been avoided and the desired products obtained in a state of purity and sufficiently high yield to be commercially attractive, by employing a change in procedure over other processes heretofore described and employed. A more important feature of the new procedure is the time factor involved since the reaction by the improved process is complete after about two hours as compared with up to eighteen hours required by the older processes. This unexpected advantage follows from adding the aldehyde to the acid-phenol mixture in a solvent rather than as was previously the custom, adding acid to the aldehyde-phenol mixture without the use of any solvent. Detailed examples of the new process follow.

A suitable reactor is charged with 164 parts (1.0 mole) of 6-tert-butyl-m-cresol and 100 parts of methanol and 42 parts of concentrated (35%) hydrochloric acid are added with stirring. The mixture is then agitated and heated to the temperature of slow reflux (80–82° C.). Thereupon 39.6 parts (0.55 mole) of butyraldehyde are added gradually over a period of an hour to the refluxing solution and with continued agitation. After the aldehyde is all added, the entire charge is agitated for an additional hour at the temperature of refluxing. Thereupon the entire mixture is cooled to a temperature of about 30° C. and 100 parts of water added. The mixture is stirred and the water drawn off and another 100 parts added. Washing with water is repeated several times in the same manner. Any traces of acid remaining in the last wash are neutralized so that the slurry is neutral or slightly basic. The final water wash is drawn off and 175 parts of a suitable petroleum solvent, for example heptane, are added and agitation continued for about 10 minutes. The charge is then filtered, the solid product washed with more heptane and the desired 4,4'-butylidene bis(6-tert-butyl-m-cresol) dried in an oven maintained at about 70° C. The product is a white crystalline solid melting at 212–213° C.

By a like procedure to that described above, 6-tert-butyl-m-cresol has been reacted with paraformaldehyde, acetaldehyde, propionaldehyde, isobutyraldehyde, 2-ethyl crotonaldehyde, hexaldehyde and heptaldehyde to produce the corresponding bisphenols. However, the process is particularly advantageous with aldehydes above formaldehyde. The experimental evidence suggests that in the presence of alcohol the aldehyde exists in equilibrium with a hemiacetal or acetal. Whether or not this is the correct explanation, tendency of the aldehyde for self condensation is reduced without decreasing reactivity with the phenol. This is an important advantage because self condensation of the aldehyde yields undesirable by-products.

The substitution of methanol by isopropanol in the foregoing procedure gave comparable results both as to reaction time and yield. Other alcohols, preferably primary and secondary alcohols, as for example ethanol, n-butanol, n-propanol and sec-butanol are also suitable.

While the exact procedure set forth in the example is not to be considered as restrictive and limited as to detail, yet the conditions therein imposed represent those most necessary for the production of an alkylidene bisphenol of satisfactory purity and yield. Without a solvent, a considerable quantity of polymeric by-products result which are difficult to remove from the desired product. Consequently, a suitable alcohol, menthanol, was employed in quantity sufficient to effect complete solution of the reactants. A lesser quantity was found less effective and a larger quantity failed materially to increase the yield. Varying the quantity of excess of aldehyde employed showed that an excess up to 0.39 mole increased the yield of product slightly, but decreased the rate of filtration while a larger increase caused the formation af a greater quantity of undesired by-product. Likewise reacting at temperatures below 60° C. showed that the higher yields were not obtained. In a like manner, the quantity of acid employed is that found to be best adapted for the condensation. While, then, variations are possible in the process described, it is obvious that optimum conditions to favor the formation of the bisphenol rather than resinous by-products should be chosen. For this reason the short reaction period described is all important.

The product herein described, namely 4,4'-butylidene bis(6-tert-butyl-m-cresol), and other analogues of the product, have been found effective as color stabilizers of light colored vulcanized rubber goods, as antioxidants of organic products, as bacteriocides and other uses.

It is intended to cover all changes and modifications of the examples of the invention herein chosen for purposes of disclosure which do not constitute departures from the spirit and scope of the invention.

What is claimed is:

1. The process of producing an aliphatic bisphenol of the class comprising the alkyl and alkylidene derivatives thereof, which comprises reacting at a temperature of at least 60° C. 6-tert-butyl-m-cresol in alcoholic solution with an aliphatic aldehyde containing from two to seven carbon atoms in the presence of a strong aqueous mineral acid, the aldehyde being added gradually to a mixture of acid and phenol.

2. The process of producing 4,4'-butylidene bis(6-tert-butyl-m-cresol) which comprises slowly adding butyraldehyde to an alcoholic solution of concentrated aqueous hydrochloric acid and 6-tert-butyl-m-cresol at the temperature of reflux, heating the mixture for an additional time period, cooling, purifying and collecting the product.

3. The process of producing 4,4'-butylidene bis(6-tert-butyl-m-cresol) which comprises adding concentrated aqueous hydrochloric acid to a methanol solution of 6-tert-butyl-m-cresol, agitating the mixture, heating the mixture to a temperature of reflux, slowly adding butyraldehyde thereto, additionally heating the mixture at the refluxing temperature, cooling the mixture, adding a saturated salt solution and a petroleum solvent thereto, filtering, washing and drying the product.

4. The process of producing 4,4'-butylidene bis(6-tert-butyl-m-cresol) which comprises adding concentrated aqueous hydrochloric acid to an isopropanol solution of 6-tert-butyl-m-cresol, agitating the mixture, heating the mixture to a temperature of reflux, slowly adding butyraldehyde thereto, additionally heating the mixture at the refluxing temperature, cooling the mixture, adding a saturated salt solution and a petroleum solvent thereto, filtering, washing and drying the product.

References Cited in the file of this patent

UNITED STATES PATENTS

| | | |
|---|---|---|
| 2,334,408 | Gump et al. | Nov. 16, 1943 |
| 2,430,002 | De Groote et al. | Nov. 4, 1947 |
| 2,632,775 | Cooper et al. | Mar. 24, 1953 |
| 2,647,102 | Ambelang | July 28, 1953 |

OTHER REFERENCES

Faith: Jour. Amer. Chem. Soc., vol. 72, pp. 837–9 (3 pp.; February 1950).

Beaver et al.: Jour. Amer. Chem. Soc., vol. 74, pp. 3410–11 (2 pp.; July 1952).